(12) United States Patent
Chandra et al.

(10) Patent No.: US 12,230,248 B2
(45) Date of Patent: Feb. 18, 2025

(54) UNSUPERVISED CLUSTERING OF INTENTS FOR NATURAL LANGUAGE UNDERSTANDING

(71) Applicant: PwC Product Sales LLC, New York, NY (US)

(72) Inventors: Prakash Chandra, Fremont, CA (US); Santosh Gupta, San Jose, CA (US); Ajay Nandanwar, Campbell, CA (US); Sanjay Verma, Atherton, CA (US); Devendra Vidhani, Pleasanton, CA (US)

(73) Assignee: PwC Product Sales LLC, New York, NY (US)

( * ) Notice: Subject to any disclaimer, the term of this patent is extended or adjusted under 35 U.S.C. 154(b) by 344 days.

(21) Appl. No.: 17/545,555

(22) Filed: Dec. 8, 2021

(65) Prior Publication Data
US 2022/0208177 A1    Jun. 30, 2022

Related U.S. Application Data

(60) Provisional application No. 63/131,515, filed on Dec. 29, 2020.

(51) Int. Cl.
*G10L 15/06* (2013.01)
*G06N 3/045* (2023.01)
(Continued)

(52) U.S. Cl.
CPC ............ *G10L 15/063* (2013.01); *G06N 3/045* (2023.01); *G06N 3/088* (2013.01); *G10L 25/30* (2013.01)

(58) Field of Classification Search
CPC ....... G10L 15/063; G10L 25/30; G06N 3/045; G06N 3/088
See application file for complete search history.

(56) References Cited

U.S. PATENT DOCUMENTS

2021/0233149 A1* 7/2021 Korpeoglu ........ G06F 16/90328
2021/0295203 A1* 9/2021 Liao ....................... G06N 3/006
(Continued)

OTHER PUBLICATIONS

Cer et al. (Apr. 12, 2018). "Universal Sentence Encoder," doi:arxiv:1803.11175v2; 7 pages.

*Primary Examiner* — Fan S Tsang
*Assistant Examiner* — David Siegel
(74) *Attorney, Agent, or Firm* — Morrison & Foerster LLP (57) ABSTRACT

The present disclosure relates generally to natural language understanding. An exemplary computer-enabled method comprises: receiving first utterance data corresponding to a first plurality of intents; identifying a first plurality of intent clusters using an unsupervised machine-learning algorithm, wherein each intent cluster of the first plurality of intent clusters comprises a respective subset of the first plurality of intents; training, based on the first utterance data, an intent cluster classification model, wherein the intent cluster classification model is configured to receive a user utterance and identify an intent cluster of the first plurality of intent clusters; and training, based on the first utterance data, an intent classification model for each intent cluster of the first plurality of intent clusters to obtain a plurality of intent classification models, wherein each intent classification model is configured to receive the user utterance and identify an intent from the respective intent cluster.

19 Claims, 8 Drawing Sheets

(51) Int. Cl.
 *G06N 3/088* (2023.01)
 *G10L 25/30* (2013.01)

(56) References Cited

U.S. PATENT DOCUMENTS

2021/0399999 A1* 12/2021 Soiaporn ................ G06N 20/20
2022/0094648 A1* 3/2022 Le .......................... G06F 18/22

* cited by examiner

UNSUPERVISED CLUSTERING OF INTENTS FOR NATURAL LANGUAGE UNDERSTANDING

CROSS-REFERENCE TO RELATED APPLICATION

This application claims the benefit of U.S. Provisional Application No. 63/131,515, filed Dec. 29, 2020, the entire contents of which are incorporated herein by reference for all purposes.

FIELD

The present disclosure relates generally to natural language understanding, and more specifically to a system and method for performing intent classification (e.g., of a user utterance provided to a conversational bot or intelligent assistant) using an automatically generated hierarchy to improve performance.

BACKGROUND

Software having natural language understanding ("NLU") capabilities, such as conversational bots and intelligent assistants, generally can perform intent classification or identification. Intent classification involves receiving a user input (e.g., a user utterance) and identifying an intent corresponding to the user input. As NLU is being implemented in more and more contexts, the number of user intents to be supported by the software is also growing.

SUMMARY

As explained above, the number of different intents that need to be supported by modern NLU systems is growing. As the number of intents to be interpreted by a software model grows, it becomes difficult for the model to achieve intent classification without performance degradation. For example, with an increasing number of intents, some intents start to overlap. As such, additional datasets (e.g., with more specificity) may be needed to train the model. However, the additional datasets may introduce more overlapping intents, further exacerbating the problem.

In some embodiments, overlapping intents can be a set of intents for which the user utterances can be so semantically similar that, given a particular utterance, the system is unable to distinguish between the two based on the provided set of training utterances. For example, the utterances corresponding to the intents related to a user's capital balance, HSA balance, and 401k balance can be similar. If a single model is trained to process all of these utterances, the system may incorrectly determine that the user is inquiring about the capital balance when the user is in fact inquiring about the 401k balance. Although this may be somewhat mitigated by overtraining the system for nearly all exactly possible utterances, but that generally degrades the overall system performance. Further, when the system also adds intents related to other types of balance, the system performance further degrades. These overlapping intents depend on use cases and can differ from organization to organization.

While a hierarchical approach (rather than a single model approach) may not suffer from the same performance degradation, there is significant cost required to set up the hierarchical structure. For example, in a hierarchical structure in which the intents are grouped by domains, the domains, the underlying ontology for each domain, and the intents in each domain all need to be pre-defined manually. This can be very cumbersome, expensive, and potentially inaccurate especially when there is a limited amount of data to guide the process.

The present disclosure comprises a hierarchical approach including a well-balanced and trained supermodel and clusters of models each trained with extra utterances. This prevents the system from having to over-train an entire model and degrading performance. The hierarchical approach can work with any intents or sets of intents.

An exemplary computer-enabled method for providing a natural-language-processing system comprises: receiving first utterance data corresponding to a first plurality of intents; identifying, based on the first utterance data, a first plurality of intent clusters using an unsupervised machine-learning algorithm, wherein each intent cluster of the first plurality of intent clusters comprises a respective subset of the first plurality of intents; training, based on the first utterance data, an intent cluster classification model, wherein the intent cluster classification model is configured to receive a user utterance and identify an intent cluster of the first plurality of intent clusters; and training, based on the first utterance data, an intent classification model for each intent cluster of the first plurality of intent clusters to obtain a plurality of intent classification models, wherein each intent classification model is configured to receive the user utterance and identify an intent from the respective intent cluster.

In some embodiments, the first utterance data comprises a plurality of utterances associated with the first plurality of intents.

In some embodiments, the method further comprises obtaining a first training dataset by performing embedding of the first utterance data.

In some embodiments, the unsupervised machine-learning algorithm is a cosine similarity clustering algorithm.

In some embodiments, the plurality of intent classification models comprises a first type of machine-learning model and a second type of machine-learning model.

In some embodiments, the method further comprises receiving second utterance data corresponding to a second plurality of intents; and identifying, based on the first utterance data and the second utterance data, a second plurality of intent clusters using the unsupervised machine-learning algorithm, wherein each intent cluster comprises a subset of the first plurality and second plurality of intents.

In some embodiments, the method further comprises retraining, based on the first utterance data and the second utterance data, the intent cluster classification model.

In some embodiments, the method further comprises retraining, based on the first utterance data and the second utterance data, an intent classification model of the plurality of intent classification model.

In some embodiments, the method further comprises: training, based on the first utterance data and the second utterance data, a new intent classification model not included in the plurality of intent classification model.

An exemplary method of performing natural-language understanding comprises: receiving a user utterance; inputting the user utterance to an intent cluster classification model to obtain a pre-defined intent cluster of a plurality of pre-defined intent clusters, wherein the plurality of pre-defined intent clusters are automatically identified using an unsupervised machine-learning algorithm; inputting the user utterance to an intent classification model corresponding to the obtained pre-defined intent cluster to obtain an intent associated with the user utterance.

In some embodiments, the user utterance is an input to a conversational bot.

In some embodiments, the unsupervised machine-learning algorithm is a cosine similarity clustering algorithm.

In some embodiments, the method further comprises: generating a response to the user utterance based on the intent.

In some embodiments, the intent classification model is a neural network model.

An exemplary non-transitory computer-readable storage medium stores one or more programs, the one or more programs comprising instructions, which when executed by one or more processors of an electronic device, cause the electronic device to: receive first utterance data corresponding to a first plurality of intents; identify, based on the first utterance data, a first plurality of intent clusters using an unsupervised machine-learning algorithm, wherein each intent cluster of the first plurality of intent clusters comprises a respective subset of the first plurality of intents; train, based on the first utterance data, an intent cluster classification model, wherein the intent cluster classification model is configured to receive a user utterance and identify an intent cluster of the first plurality of intent clusters; and train, based on the first utterance data, an intent classification model for each intent cluster of the first plurality of intent clusters to obtain a plurality of intent classification models, wherein each intent classification model is configured to receive the user utterance and identify an intent from the respective intent cluster.

An exemplary non-transitory computer-readable storage medium stores one or more programs, the one or more programs comprising instructions, which when executed by one or more processors of an electronic device, cause the electronic device to: receive a user utterance; input the user utterance to an intent cluster classification model to obtain a pre-defined intent cluster of a plurality of pre-defined intent clusters, wherein the plurality of pre-defined intent clusters are automatically identified using an unsupervised machine-learning algorithm; input the user utterance to an intent classification model corresponding to the obtained pre-defined intent cluster to obtain an intent associated with the user utterance.

An exemplary electronic device comprises: one or more processors; a memory; and one or more programs, wherein the one or more programs are stored in the memory and configured to be executed by the one or more processors, the one or more programs including instructions for: receiving first utterance data corresponding to a first plurality of intents; identifying, based on the first utterance data, a first plurality of intent clusters using an unsupervised machine-learning algorithm, wherein each intent cluster of the first plurality of intent clusters comprises a respective subset of the first plurality of intents; training, based on the first utterance data, an intent cluster classification model, wherein the intent cluster classification model is configured to receive a user utterance and identify an intent cluster of the first plurality of intent clusters; and training, based on the first utterance data, an intent classification model for each intent cluster of the first plurality of intent clusters to obtain a plurality of intent classification models, wherein each intent classification model is configured to receive the user utterance and identify an intent from the respective intent cluster.

An exemplary electronic device comprises: one or more processors; a memory; and one or more programs, wherein the one or more programs are stored in the memory and configured to be executed by the one or more processors, the one or more programs including instructions for: receiving a user utterance; inputting the user utterance to an intent cluster classification model to obtain a pre-defined intent cluster of a plurality of pre-defined intent clusters, wherein the plurality of pre-defined intent clusters are automatically identified using an unsupervised machine-learning algorithm; inputting the user utterance to an intent classification model corresponding to the obtained pre-defined intent cluster to obtain an intent associated with the user utterance.

DETAILED DESCRIPTION

Described herein are systems and methods for performing intent classification using a hierarchy of models. The hierarchical structure does not suffer from the same performance degradation experienced by a single intent classification model as the number of intents to classify increases. Further, the hierarchical structure can be automatically generated using an unsupervised learning algorithm, thus eliminating cost associated with manual efforts (e.g., by linguists and data scientists) to formulate the necessary ontology.

The following description sets forth exemplary methods, parameters, and the like. It should be recognized, however, that such description is not intended as a limitation on the scope of the present disclosure but is instead provided as a description of exemplary embodiments.

Although the following description uses terms "first," "second," etc. to describe various elements, these elements should not be limited by the terms. These terms are only used to distinguish one element from another. For example, a first graphical representation could be termed a second graphical representation, and, similarly, a second graphical representation could be termed a first graphical representation, without departing from the scope of the various described embodiments. The first graphical representation and the second graphical representation are both graphical representations, but they are not the same graphical representation.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Figure 1A:
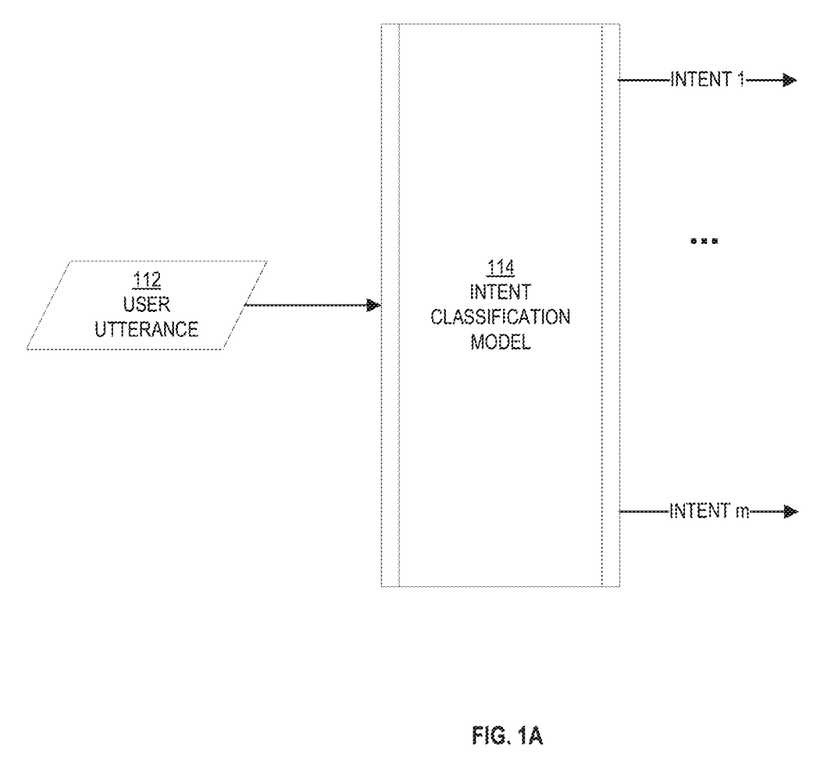
FIG. 1A illustrates a single-model approach to intent classification.

FIG. 1A illustrates a single-model approach to intent classification. With reference to FIG. 1A, a single intent classification model 114 is configured to receive a user utterance and identify an intent associated with the user utterance. In the depicted example, the model 114 can classify m number of pre-defined intents. Specifically, the model provides m number of outputs corresponding to the m number of pre-defined intents, respectively. Each output can be a probabilistic value indicating the likelihood that the user utterance is associated with the respective intent, and the intent having the highest probabilistic value is selected as the final intent. It should be appreciated that the intent classification model 114 can be configured to provide other formats of outputs to indicate the identified intent.

The single-model approach to intent classification can suffer from performance degradation as the number of intents, m, increases. For example, when m increases, some intents may start to overlap. As such, additional datasets (e.g., with more specificity) may be needed to train the model 114 to classify an increased number of intents. However, the additional datasets may introduce more overlapping intents, further exacerbating the problem.

The hierarchical approach to intent classification can improve the performance of any underlying model, as the overall probability for the classification improves by limiting the number of classes required for classification at each stage and thus reducing the chances of intent overlap as additional datasets are included in the application. This is illustrated in FIG. 1B, as described below.

Figure 1B:
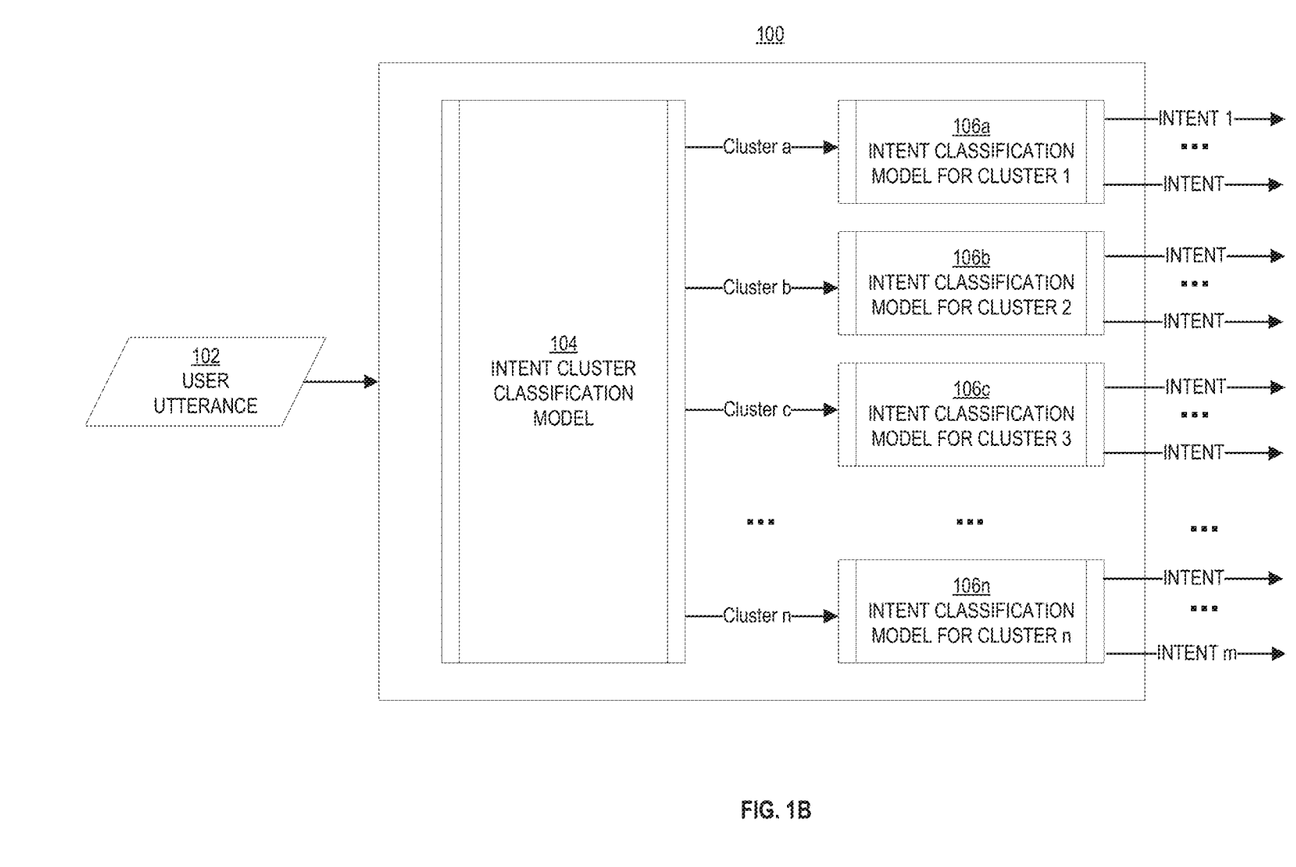
FIG. 1B illustrates a hierarchical approach to intent classification, in accordance with some embodiments.

With reference to FIG. 1B, a hierarchy of multiple models 100 is used to classify a user utterance 102 with respect to m number of intents. The hierarchy 100 comprises two layers—the first layer comprises an intent cluster classification model 104 and the second layer comprises a plurality of intent classification models 106a-n. The intent cluster classification model 104 is configured to receive a user utterance and identify an intent cluster associated with the user utterance. In the depicted example, there are n intent clusters 1-n. Intent classification models 106a-n are associated with the intent clusters 1-n, respectively. Each intent classification model is configured to receive a user utterance and identify an intent associated with the user utterance within the respective intent cluster.

In operation, the system receives a user utterance 102 (e.g., via a conversational bot interface). The system invokes intent cluster classification model 104 and provides the user utterance 102 to the model 104 to identify an intent cluster associated with the user utterance 102. Based on the identified user cluster, the system invokes the intent classification model associated with the identified user cluster to identify the intent. For example, the intent cluster classification model 104 can determine that the user utterance 102 is associated with Cluster n. Accordingly, the system invokes the intent classification model 106n. The intent classification model 106n can receive the user utterance 102 and identify an intent within intent cluster n associated with the user utterance.

The system does not invoke the intent classification models not associated with the identified intent cluster. In the example above, the system only invokes the intent classification model 106n, not the rest of the intent classification models in the second layer of the hierarchy.

The hierarchy of models 100 results in a number of technical improvements. First, for a given user utterance, the hierarchy of models 100 analyzes a given user utterance with respect to only a subset of intents 1-m (i.e., only the intents in the identified intent cluster and not the intents in the other clusters). The reduction in classes for classification at each layer enables better training (and better performance) for each model in the hierarchy while reducing the chances of intent overlap. Thus, the overall performance for the classification improves. In other words, the performance of the model hierarchy 100 can better scale as the number of intents increases.

Figure 2A:
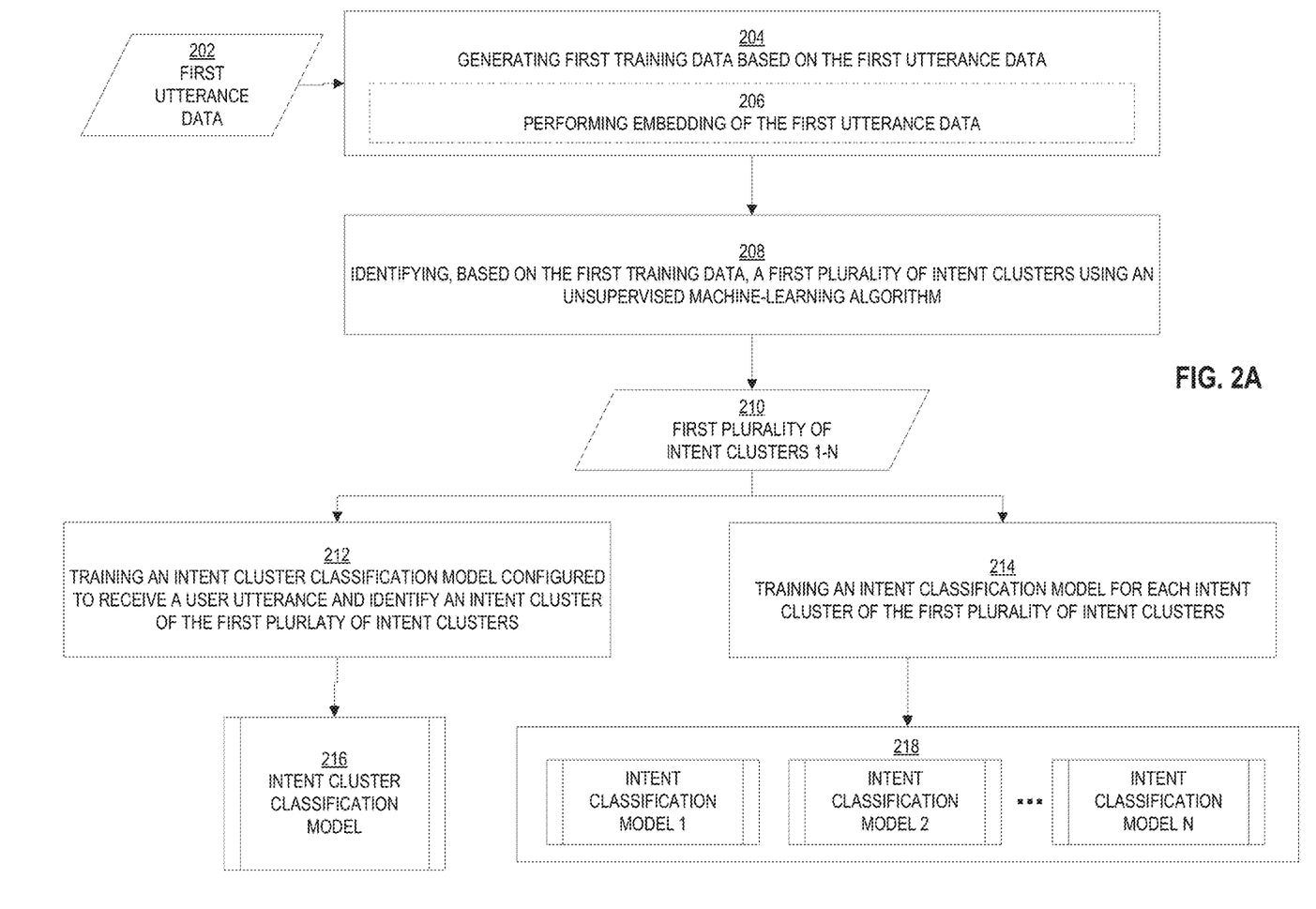
FIG. 2A illustrates an exemplary workflow for creating clusters of intents to support the hierarchical approach, in accordance with some embodiments.

Further, the hierarchy of models 100 is automatically generated by an unsupervised learning algorithm, as described further with reference to FIG. 2A. As described above, manually setting up a hierarchical structure can be very cumbersome, expensive, and potentially inaccurate especially when there is a limited amount of empirical data to guide the process (e.g., only a list of intents and the corresponding training utterances). In contrast, the hierarchy structure (e.g., the intent clusters) is automatically generated with limited dataset (normally available from conversational logs or other means through which users generate queries) and minimal linguist involvement.

FIG. 2A illustrates an exemplary workflow for creating clusters of intents to support the hierarchical approach, in accordance with some embodiments. Process 200 is performed, for example, using one or more electronic devices implementing a software platform. In some examples, process 200 is performed using a client-server system, and the blocks of process 200 are divided up in any manner between the server and a client device. In some embodiments, process 200 is performed using only a client device or only multiple client devices. In process 200, some blocks are, optionally, combined, the order of some blocks is, optionally, changed, and some blocks are, optionally, omitted. In some examples, additional steps may be performed in combination with the process 200. Accordingly, the operations as illustrated (and described in greater detail below) are exemplary by nature and, as such, should not be viewed as limiting.

At block 204, an exemplary system (e.g., one or more electronic devices) generates first training data based on first utterance data 202. The first utterance data 202 can be collected from conversation logs. In some embodiments, a minimal set of utterance can be generated, collected, and/or expanded upon through a user survey, through outsourced solutions (e.g., contractors), and/or through experts (e.g., linguists). In the first utterance data 202, the utterances are associated with pre-defined intents. For example, the first utterance data 202 may include an utterance "What is my HSA balance" and an utterance "have I reached my HAS maximum" associated with the intent "hsa_balance," an utterance "my 401k balance" and an utterance "what's my 401 maximum" associated with the intent "401k_balance," an utterance "what's my capital balance" associated with intent "capital_balance."

In some embodiments, the system performs embedding of the first utterance data. For example, the system can use either a sentence embedding, word embedding, or a combination of both to encode the first utterance data into embedding vectors. Pre-trained sentence and word embedding models can be employed to perform the embedding, thereby alleviating the need of a large training dataset.

For example, the system provides the first utterance data to a natural-language processing embedding model that is configured to create a vector in an n-dimensional space corresponding to each utterance. This embedding generator model can be pre-trained based on the desired language (e.g., English) and creates an n-dimensional vector for utterances based on semantic similarity. For example, if the utterances are specific to particular domain(s) such as medical science, the embedding generator model can be pre-trained on medical journal data to be able to derive semantic similarity among the utterances based on medical ontology.

At block 209, the system identifies, based on the first training data, a first plurality of intent clusters 1-N using an unsupervised machine-learning algorithm. For example, the embedded vectors can be used to create clusters of the dataset using the cosine similarity to find the distance between vectors in n-dimensions and cluster them, or using k-nearest neighbor, k-means, BIRCH algorithm, etc., for unsupervised clustering of the data. Using the unsupervised clustering approach eases any annotation requirements. Because each utterance is associated with a pre-defined intent, the clustering of utterances essentially creates clusters of intents. In some embodiments, the system can be further optimized to pre-define the number of clusters to be created based on the total number of intents and to achieve a nearly even distribution of intents within the clusters.

For example, the first utterance data 202 may include an utterance "What is my HSA balance" and an utterance "have I reached my HAS maximum" associated with the intent "hsa_balance," an utterance "my 401k balance" and an intent "what's my 401 maximum" associated with the intent "401k_balance," an utterance "what's my capital balance" associated with intent "capital_balance." After clustering, all utterances (and thus associated intents) related to the capital balance can be in one cluster, all utterances (and thus associated intents) related to the HSA balance can be in another cluster, and all utterances (and thus associated intents) related to 401k can be in yet another cluster.

If an intent is defined by multiple utterances and all of the utterances (or the corresponding embeddings) are clustered into one particular intent cluster, then the intent is deemed to belong to that particular intent cluster. However, if the utterances associated with an intent are clustered into multiple different intent clusters, the system can automatically determine which intent cluster that the intent belongs to. In some embodiments, the system selects the highest frequency cluster (e.g., the cluster having the maximum number of utterances corresponding to the intent). This can occur because there can be multiple utterances that a user may use to invoke an intent and the utterances may be semantically different.

For example, an intent "insights_me_at_work" may be defined by utterances: "view my work profile," "tell me about myself," "I need my personal details," "show me my profile details," "display my financial summary," "vacation time," "about myself," etc. These utterances may be grouped into different intent clusters. Thus, the system can select one intent cluster based on the distribution of the utterances among the various clusters.

At block 212, the system trains an intent cluster classification model 216. The intent classification model 216 is configured to receive a user utterance and identify an intent cluster from the intent clusters 1-N. The intent classification model is the first layer in the hierarchy of models, as illustrated by intent cluster classification model 104 in FIG. 1B. For example, the intent cluster classification model can be trained to receive a user utterance and determine if the user utterance is related to the HAS balance cluster, the 401k balance cluster, or the capital balance cluster.

At block 214, the system trains an intent classification model for each intent cluster of clusters 1-N. Thus, the system obtains N number of intent classification models. Each intent classification model is configured to receive a user utterance and identify an intent within the corresponding intent cluster. For example, intent classification model N is configured to receive a user utterance and identify an intent from the intents in the intent cluster N. The intent classification models 218 form the second layer in the hierarchy of models, as illustrated by intent classification models 106a-n in FIG. 1B.

For example, three separate intent classification models can be trained for the capital balance cluster, the HSA balance cluster, and the 401k balance cluster, respectively. When deployed, the intent cluster classification model may first be used to determine that the inquiry is related to the 401k balance cluster and forward the user inquiry to the 401k intent classification model, which in turn is specifically trained to distinguish between different 401k intents. In some embodiments, additional utterances (to the first utterance data 202) can be generated to train the intent classification models. For example, additional utterances related to 401k inquiries can be generated to train the 401k intent classification model.

The intent classification models 1-N are trained using different training datasets. For example, intent classification model 1 is trained using training utterances corresponding to intents within intent cluster 1, while intent classification model N is trained using training utterances corresponding to intents within intent cluster N. In some embodiments, the training utterances for each intent classification model includes some utterances from the first utterance data 202 and/or additional utterances corresponding to intents within the respective cluster (e.g., formulated by a linguist).

In some embodiments, the intent classification models can comprise different types of models.

Figure 2B:
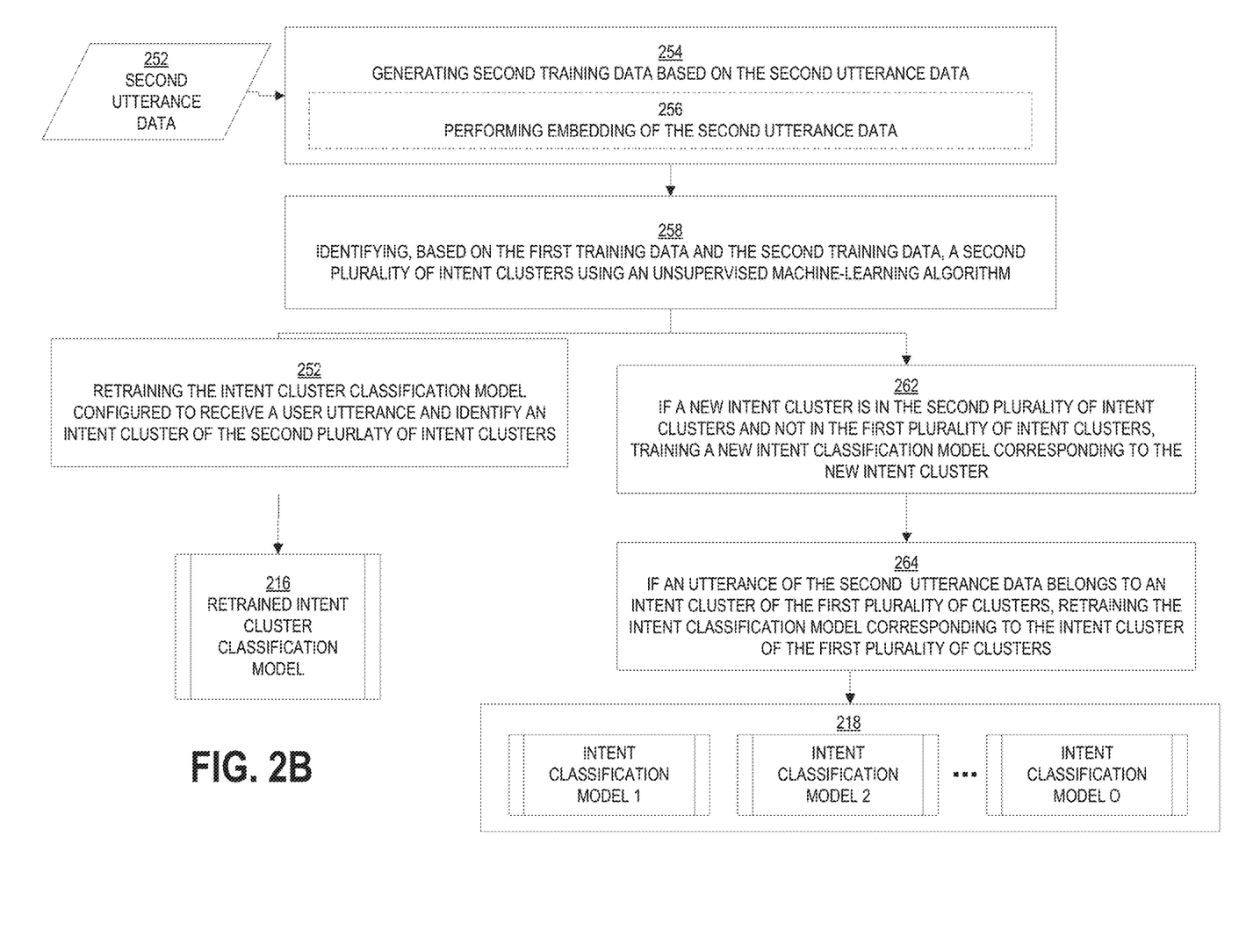
FIG. 2B illustrates an exemplary workflow for updating clusters of intents to support the hierarchical approach, in accordance with some embodiments.

FIG. 2B illustrates an exemplary workflow for updating clusters of intents to support the hierarchical approach, in accordance with some embodiments. Process 250 is performed, for example, using one or more electronic devices implementing a software platform. In some examples, process 250 is performed using a client-server system, and the blocks of process 250 are divided up in any manner between the server and a client device. In some embodiments, process 250 is performed using only a client device or only multiple client devices. In process 250, some blocks are, optionally, combined, the order of some blocks is, optionally, changed, and some blocks are, optionally, omitted. In some examples, additional steps may be performed in combination with the process 250. Accordingly, the operations as illustrated (and described in greater detail below) are exemplary by nature and, as such, should not be viewed as limiting.

With reference to FIG. 2B, the system receives second utterance data. The second utterance data can correspond to new intents to be included in the system's NLU capabilities. For example, if the system comprises a conversational bot and its NLU capabilities are to be extended to include new intents, the second utterance may include exemplary utterances corresponding to these new intents. For example, the second utterance data can include "check my company's 401k benefits" and "what's my IRA balance."

At block 254, the system generates second training data based on the second utterance data 252. In some embodiments, the system performs embedding of the second utterance data. For example, the system can use either a sentence embedding, word embedding, or a combination of both to encode the second utterance data into embedding vectors. Pre-trained sentence and word embedding models can be employed to perform the embedding, thereby alleviating the need of a large training dataset.

At block 258, the system uses an unsupervised machine-learning algorithm to identify a second plurality of intent clusters based on the first training data and the second training data. In other words, the system combines the first and second training data and performs re-clustering. As a result, new clusters may be identified due to the addition of the second training data. For example, the system may identify a new intent cluster, the IRA cluster, corresponding to the intent associated with the new utterance "what's my IRA balance." Further, a new intent associated with the second training data may be clustered into an existing intent cluster of the first plurality of clusters. For example, the system may determine that the intent associated with the new utterance "check my company's 401k benefits" should be clustered into the existing 401k cluster.

At block 252, the system retrains the intent cluster classification model 216 based on the first and the second training data. The intent cluster classification model is configured to receive a user utterance and identify an intent cluster of the second plurality of intent clusters.

Figure 1C:
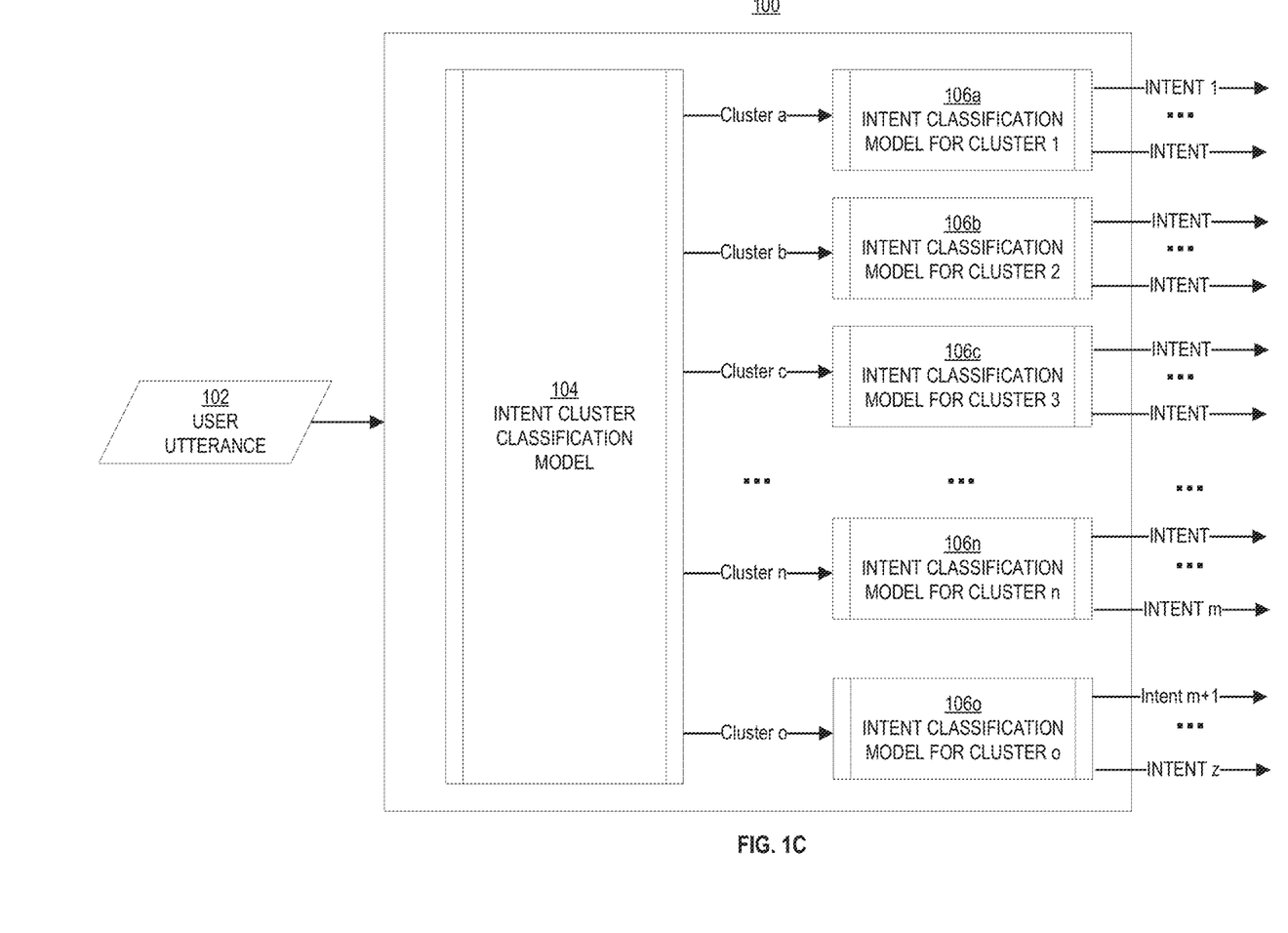
FIG. 1C illustrates an updated hierarchical structure, in accordance with some embodiments.

At block 262, if a new intent cluster is identified in the second plurality of intent clusters that is not in the first plurality of intent clusters, the system trains a new intent classification model (e.g., model O in 218) corresponding to the new intent cluster. For example, with reference to FIG. 1C, if a new intent cluster o is identified, a new intent classification model 106o is trained. The new intent classification model is trained based on only the training data corresponding to the intents within the new intent cluster. For example, the system may train a new intent classification model to process IRA inquiries.

At block 264, if a new intent in the second utterance data belongs to an existing intent cluster of the first plurality of clusters, the system retrains the existing intent classification model. For example, with reference to FIG. 1C, if a new intent in the second utterance data belongs to the intent cluster N, the intent classification model 106n is retrained such that it can classify the new intent. For example, the system may retrain the 401k intent classification model such that it can process the new intent "check my company's 401k benefits."

Accordingly, when new intents are added to the NLU capability of the system, not all intent classification models 1061-n need to be retrained. Further, re-clustering is performed automatically. This eliminates the significant cost required by prior art to for manually define new ontology to incorporate the new intents into an existing system.

The same model(s) can be retrained for the intent hierarchy to achieve a performance improvement without the need to rework on the underlying algorithms. The models at each layer of hierarchical NLU can now be trained with additional dataset, as needed, without degrading the performance due to intent overlaps, which is a common occurrence when a single model is trained to classify within a large number of intents. In one exemplary implementation, ~10% performance improvement over the single layer architecture is observed.

Figure 3A:
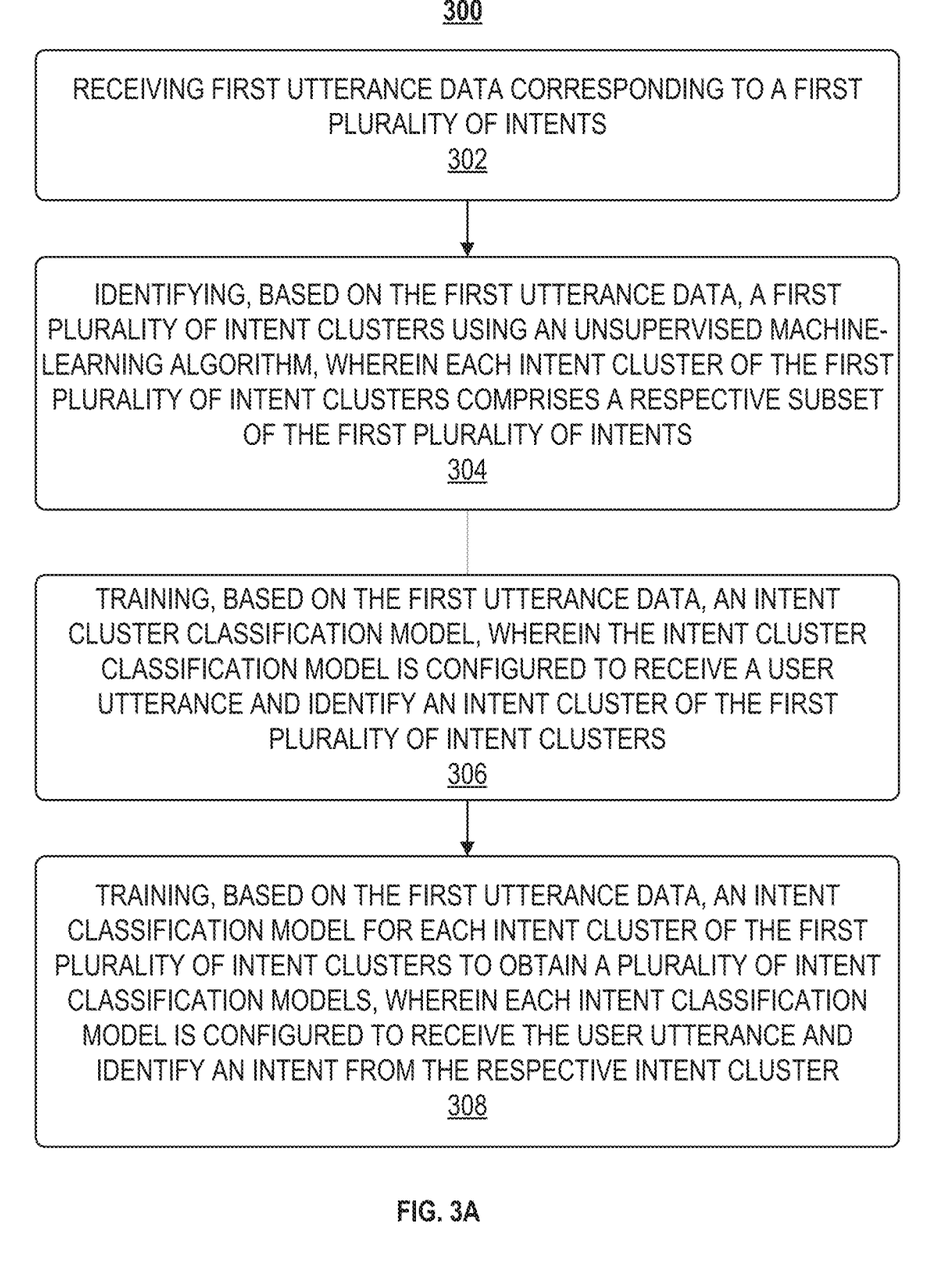
FIG. 3A illustrates an exemplary process for providing a natural-language-processing system, in accordance with some embodiments.

FIG. 3A illustrates an exemplary process for creating clusters of intents to support the hierarchical approach, in accordance with some embodiments. Process 300 is performed, for example, using one or more electronic devices implementing a software platform. In some examples, process 300 is performed using a client-server system, and the blocks of process 300 are divided up in any manner between the server and a client device. In some embodiments, process 300 is performed using only a client device or only multiple client devices. In process 300, some blocks are, optionally, combined, the order of some blocks is, optionally, changed, and some blocks are, optionally, omitted. In some examples, additional steps may be performed in combination with the process 300. Accordingly, the operations as illustrated (and described in greater detail below) are exemplary by nature and, as such, should not be viewed as limiting.

At block 302, the system (e.g., one or more electronic devices) receives first utterance data corresponding to a first plurality of intents; at block 304, the system identifies, based on the first utterance data, a first plurality of intent clusters using an unsupervised machine-learning algorithm, wherein each intent cluster of the first plurality of intent clusters comprises a respective subset of the first plurality of intents; at block 306, the system trains, based on the first utterance data, an intent cluster classification model, wherein the intent cluster classification model is configured to receive a user utterance and identify an intent cluster of the first plurality of intent clusters; and at block 308, the system trains, based on the first utterance data, an intent classification model for each intent cluster of the first plurality of intent clusters to obtain a plurality of intent classification models, wherein each intent classification model is configured to receive the user utterance and identify an intent from the respective intent cluster.

Figure 3B:
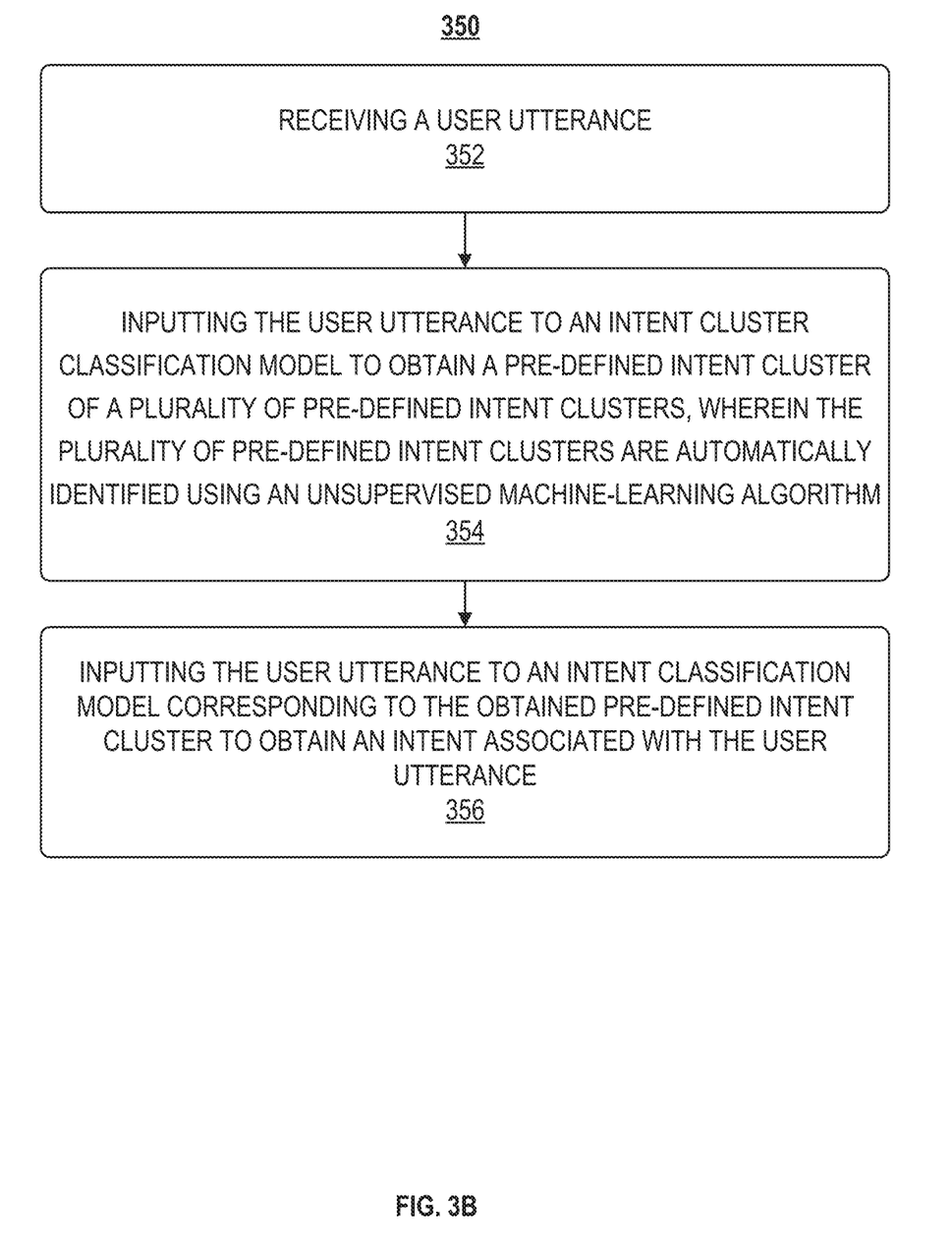
FIG. 3B illustrates an exemplary process for performing natural-language understanding, in accordance with some embodiments.

FIG. 3B illustrates an exemplary process for performing natural-language understanding, in accordance with some embodiments. Process 350 is performed, for example, using one or more electronic devices implementing a software platform. In some examples, process 350 is performed using a client-server system, and the blocks of process 350 are divided up in any manner between the server and a client device. In some embodiments, process 350 is performed using only a client device or only multiple client devices. In process 350, some blocks are, optionally, combined, the order of some blocks is, optionally, changed, and some blocks are, optionally, omitted. In some examples, additional steps may be performed in combination with the process 350. Accordingly, the operations as illustrated (and described in greater detail below) are exemplary by nature and, as such, should not be viewed as limiting.

At block 352, the system (e.g., one or more electronic devices) receives a user utterance; at block 354, the system inputs the user utterance to an intent cluster classification model to obtain a pre-defined intent cluster of a plurality of pre-defined intent clusters, wherein the plurality of pre-defined intent clusters are automatically identified using an unsupervised machine-learning algorithm; at block 356, the system inputs the user utterance to an intent classification model corresponding to the obtained pre-defined intent cluster to obtain an intent associated with the user utterance.

Figure 4:
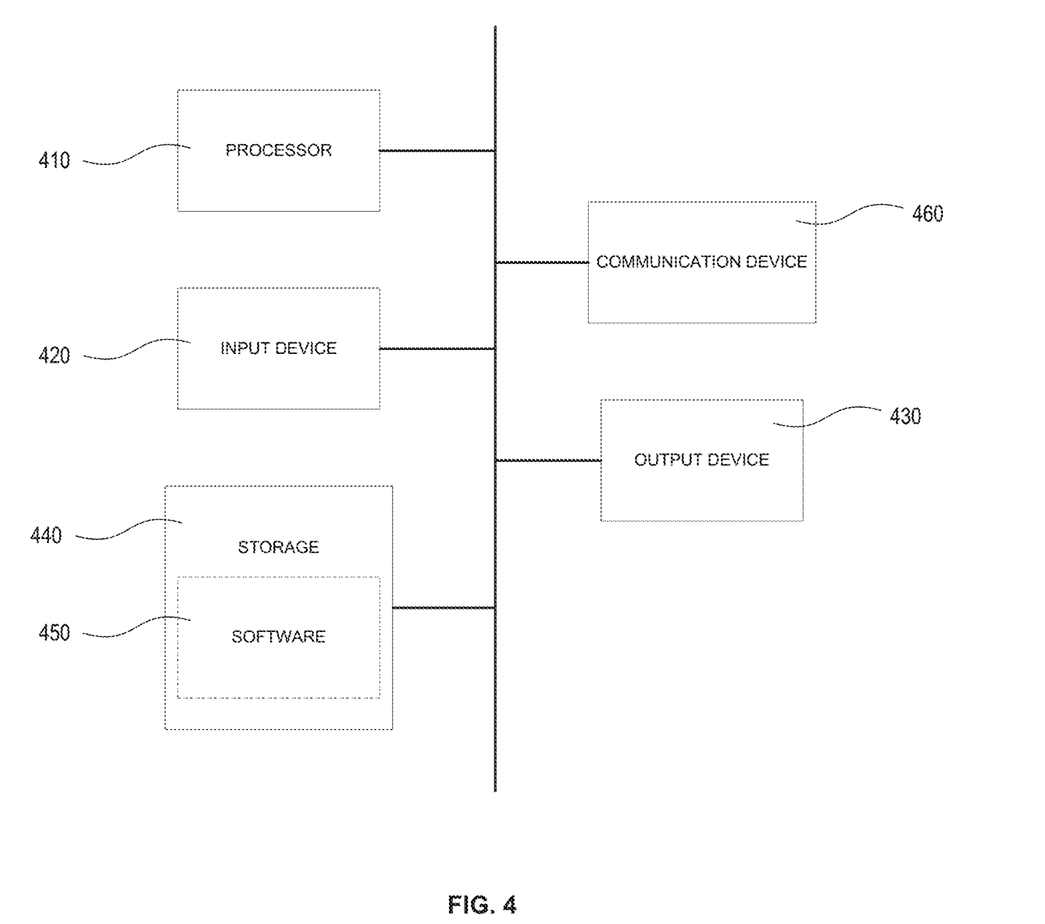
FIG. 4 illustrates an exemplary electronic device, in accordance with some embodiments.

The operations described above with reference to FIGS. 3A and 3B are optionally implemented by components depicted in FIG. 4.

FIG. 4 illustrates an example of a computing device in accordance with one embodiment. Device 400 can be a host computer connected to a network. Device 400 can be a client computer or a server. As shown in FIG. 4, device 400 can be any suitable type of microprocessor-based device, such as a personal computer, workstation, server or handheld computing device (portable electronic device) such as a phone or tablet. The device can include, for example, one or more of processor 410, input device 420, output device 430, storage 440, and communication device 460. Input device 420 and output device 430 can generally correspond to those described above, and can either be connectable or integrated with the computer.

Input device 420 can be any suitable device that provides input, such as a touch screen, keyboard or keypad, mouse, or voice-recognition device. Output device 430 can be any suitable device that provides output, such as a touch screen, haptics device, or speaker.

Storage 440 can be any suitable device that provides storage, such as an electrical, magnetic or optical memory including a RAM, cache, hard drive, or removable storage disk. Communication device 460 can include any suitable device capable of transmitting and receiving signals over a network, such as a network interface chip or device. The components of the computer can be connected in any suitable manner, such as via a physical bus or wirelessly.

Software 450, which can be stored in storage 440 and executed by processor 410, can include, for example, the programming that embodies the functionality of the present disclosure (e.g., as embodied in the devices as described above).

Software 450 can also be stored and/or transported within any non-transitory computer-readable storage medium for use by or in connection with an instruction execution system, apparatus, or device, such as those described above, that can fetch instructions associated with the software from the instruction execution system, apparatus, or device and execute the instructions. In the context of this disclosure, a computer-readable storage medium can be any medium, such as storage 440, that can contain or store programming for use by or in connection with an instruction execution system, apparatus, or device.

Software 450 can also be propagated within any transport medium for use by or in connection with an instruction execution system, apparatus, or device, such as those described above, that can fetch instructions associated with the software from the instruction execution system, apparatus, or device and execute the instructions. In the context of this disclosure, a transport medium can be any medium that can communicate, propagate or transport programming for use by or in connection with an instruction execution system, apparatus, or device. The transport readable medium can include, but is not limited to, an electronic, magnetic, optical, electromagnetic or infrared wired or wireless propagation medium.

Device 400 may be connected to a network, which can be any suitable type of interconnected communication system. The network can implement any suitable communications protocol and can be secured by any suitable security protocol. The network can comprise network links of any suitable arrangement that can implement the transmission and reception of network signals, such as wireless network connections, T1 or T3 lines, cable networks, DSL, or telephone lines.

Device 400 can implement any operating system suitable for operating on the network. Software 450 can be written in any suitable programming language, such as C, C++, Java or Python. In various embodiments, application software embodying the functionality of the present disclosure can be deployed in different configurations, such as in a client/server arrangement or through a Web browser as a Web-based application or Web service, for example.

Although the disclosure and examples have been fully described with reference to the accompanying figures, it is to be noted that various changes and modifications will become apparent to those skilled in the art. Such changes and modifications are to be understood as being included within the scope of the disclosure and examples as defined by the claims.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

What is claimed is:

1. A computer-enabled method for providing a natural-language-processing system, the method comprising:
receiving first utterance data corresponding to a first plurality of intents;
identifying, based on the first utterance data, a first plurality of intent clusters using an unsupervised machine-learning algorithm, wherein each intent cluster of the first plurality of intent clusters comprises a respective subset of the first plurality of intents;
training, based on the first utterance data, an intent cluster classification model, wherein the intent cluster classification model is configured to receive a user utterance and identify an intent cluster of the first plurality of intent clusters; and
training, based on the first utterance data, an intent classification model for each intent cluster of the first plurality of intent clusters to obtain a plurality of intent classification models, wherein each intent classification model is configured to receive the user utterance and identify an intent from the respective intent cluster.

2. The method of claim 1, wherein the first utterance data comprises a plurality of utterances associated with the first plurality of intents.

3. The method of claim 1, further comprising obtaining a first training dataset by performing embedding of the first utterance data.

4. The method of claim 1, wherein the unsupervised machine-learning algorithm is a cosine similarity clustering algorithm.

5. The method of claim 1, wherein the plurality of intent classification models comprises a first type of machine-learning model and a second type of machine-learning model.

6. The method of claim 1, further comprising:
receiving second utterance data corresponding to a second plurality of intents; and identifying, based on the first utterance data and the second utterance data, a second plurality of intent clusters using the unsupervised machine-learning algorithm, wherein each intent cluster of the second plurality of intent clusters comprises a subset of the first plurality and second plurality of intents.

7. The method of claim 6, further comprising:
retraining, based on the first utterance data and the second utterance data, the intent cluster classification model.

8. The method of claim 6, further comprising:
retraining, based on the first utterance data and the second utterance data, an intent classification model of the plurality of intent classification models.

9. The method of claim 6, further comprising:
training, based on the first utterance data and the second utterance data, a new intent classification model not included in the plurality of intent classification models.

10. A method of performing natural-language understanding, comprising:
receiving a user utterance;
inputting the user utterance to an intent cluster classification model to obtain a pre-defined intent cluster of a plurality of pre-defined intent clusters,
wherein the plurality of pre-defined intent clusters are automatically identified using an unsupervised machine-learning algorithm based on a set of utterance data, wherein the plurality of pre-defined intent clusters are automatically identified by generating a plurality of embedding vectors based on the set of utterance data, and clustering the plurality of embedding vectors;
inputting the user utterance to an intent classification model corresponding to the obtained pre-defined intent cluster to obtain an intent associated with the user utterance.

11. The method of claim 10, wherein the user utterance is an input to a conversational bot.

12. The method of claim 10, wherein the unsupervised machine-learning algorithm is a cosine similarity clustering algorithm.

13. The method of claim 10, further comprising: generating a response to the user utterance based on the intent.

14. The method of claim 10, wherein the intent classification model is a neural network model.

15. The method of claim 10, wherein the set of utterance data comprises a first utterance data and a second utterance data, and wherein the unsupervised machine-learning algorithm is trained using the first utterance data and retrained using the second utterance data.

16. A non-transitory computer-readable storage medium storing one or more programs, the one or more programs comprising instructions, which when executed by one or more processors of an electronic device, cause the electronic device to:
receive first utterance data corresponding to a first plurality of intents;
identify, based on the first utterance data, a first plurality of intent clusters using an unsupervised machine-learning algorithm, wherein each intent cluster of the first plurality of intent clusters comprises a respective subset of the first plurality of intents;
train, based on the first utterance data, an intent cluster classification model, wherein the intent cluster classification model is configured to receive a user utterance and identify an intent cluster of the first plurality of intent clusters; and train, based on the first utterance data, an intent classification model for each intent cluster of the first plurality of intent clusters to obtain a plurality of intent classification models, wherein each intent classification model is configured to receive the user utterance and identify an intent from the respective intent cluster.

17. A non-transitory computer-readable storage medium storing one or more programs, the one or more programs comprising instructions, which when executed by one or more processors of an electronic device, cause the electronic device to:
receive a user utterance;
input the user utterance to an intent cluster classification model to obtain a pre-defined intent cluster of a plurality of pre-defined intent clusters,
wherein the plurality of pre-defined intent clusters are automatically identified using an unsupervised machine-learning algorithm based on a set of utterance data, wherein the plurality of pre-defined intent clusters are automatically identified by generating a plurality of embedding vectors based on the set of utterance data, and clustering the plurality of embedding vectors;
input the user utterance to an intent classification model corresponding to the obtained pre-defined intent cluster to obtain an intent associated with the user utterance.

18. An electronic device, comprising:
one or more processors;
a memory; and
one or more programs, wherein the one or more programs are stored in the memory and configured to be executed by the one or more processors, the one or more programs including instructions for:
receiving first utterance data corresponding to a first plurality of intents;
identifying, based on the first utterance data, a first plurality of intent clusters using an unsupervised machine-learning algorithm, wherein each intent cluster of the first plurality of intent clusters comprises a respective subset of the first plurality of intents;
training, based on the first utterance data, an intent cluster classification model, wherein the intent cluster classification model is configured to receive a user utterance and identify an intent cluster of the first plurality of intent clusters; and
training, based on the first utterance data, an intent classification model for each intent cluster of the first plurality of intent clusters to obtain a plurality of intent classification models, wherein each intent classification model is configured to receive the user utterance and identify an intent from the respective intent cluster.

19. An electronic device, comprising:
one or more processors;
a memory; and
one or more programs, wherein the one or more programs are stored in the memory and configured to be executed by the one or more processors, the one or more programs including instructions for:
receiving a user utterance;
inputting the user utterance to an intent cluster classification model to obtain a pre-defined intent cluster of a plurality of pre-defined intent clusters,
wherein the plurality of pre-defined intent clusters are automatically identified using an unsupervised machine-learning algorithm based on a set of utterance data, wherein the plurality of pre-defined intent clusters are automatcially identified by generating a plurality of embedding vectors based on the set of utterance data, and clustering the plurality of embedding vectors;

inputting the user utterance to an intent classification model corresponding to the obtained pre-defined intent cluster to obtain an intent associated with the user utterance.

* * * * *